C. A. DORSEY.
SEAT SPRING.
APPLICATION FILED OCT. 17, 1914.
1,149,741.
Patented Aug. 10, 1915.
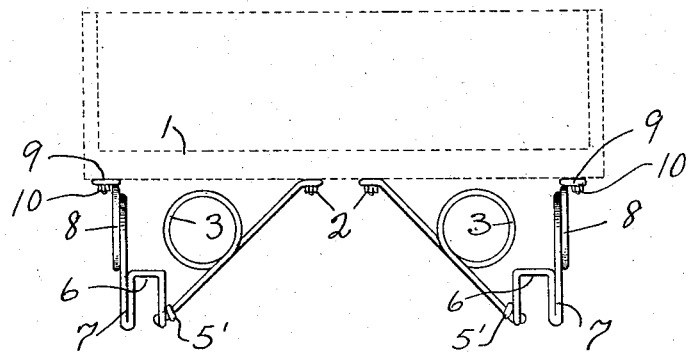
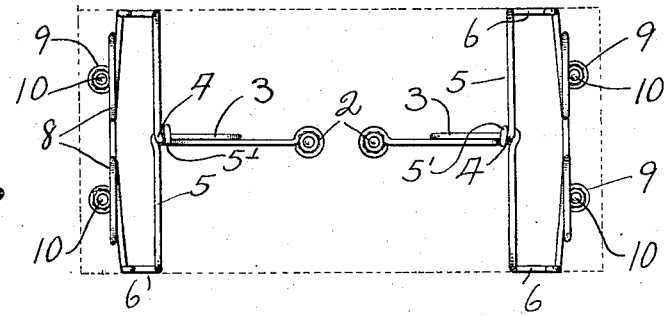
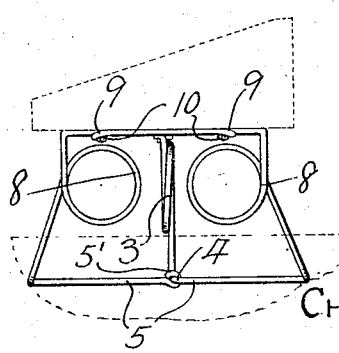
Inventor
CHARLES A. DORSEY
Witnesses
Robert M. Sutphen
A. S. Hind
By Watson E. Coleman
Attorney

UNITED STATES PATENT OFFICE.

CHARLES A. DORSEY, OF IDABEL, OKLAHOMA.

SEAT-SPRING.

1,149,741.  Specification of Letters Patent.  Patented Aug. 10, 1915.

Application filed October 17, 1914. Serial No. 867,158.

*To all whom it may concern:*

Be it known that I, CHARLES A. DORSEY, a citizen of the United States, residing at Idabel, in the county of McCurtain and State of Oklahoma, have invented certain new and useful Improvements in Seat-Springs, of which the following is a specification, reference being had to the accompanying drawings.

This invention relates to new and useful improvements in seat springs and more particularly to a seat spring, especially adapted for use in connection with vehicle seats, wherein the seat is suspended from the sides of a wagon or a carriage body but capable of use in a variety of relations.

The main object of the present invention is the provision of a seat spring whereby to provide for a suitable support for the seat so as to absorb the shock and jar which is conveyed to the vehicle body when passing over rough and uneven roads.

Another object of the present invention is the provision of a seat spring of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a front elevation of a seat, in dotted lines, illustrating my improved springs applied thereto. Fig. 2 is a bottom plan view of the seat in dotted lines, illustrating the springs applied thereto; and Fig. 3 is an end elevation of the seat and the springs.

Referring more particularly to the drawing, 1 indicates a seat which, as herein shown, is preferably adapted for use upon a wagon or similar vehicle and arranged beneath each end of the seat, are my improved springs, the construction of which will be hereinafter more fully set forth. In the general construction of each of the springs, they are to be formed of a single rod of metal of a desired weight, one end being secured to the bottom of the seat, adjacent the center thereof by means of a bolt, as shown at 2. The rod is then extended outwardly and looped, as shown at 3, thence extended outwardly and bent at right angles, as shown at 4. The rod, after forming the horizontal portion 5, is bent upon itself to form a U-shaped loop 6 adapted to engage over the upper edge of a wagon body to support the seat. The rod, after being bent to form a U-shaped loop, is bent upon itself and arranged parallel with one side of the loop, as shown at 7, thence extended inwardly and looped, as shown at 8. The rod is then extended horizontally with respect to the portion 5, said horizontal portion being provided with spaced loops 9 whereby the springs may be readily secured to the bottom of the seat by means of the bolts 10.

It will be noted that in forming each one of the supporting springs at the ends of the sides, the side portions of these springs are formed substantially alike and the second end of the rod is curved upon the bent portion 4, as shown at 5, to securely retain each of the side portions of the springs in their effective positions, so that the loops 8, together with the loop 3 will absorb the shock and jar which is generally conveyed to the body of the seat, caused by a vehicle passing over rough and uneven roads.

It will be noted that by having one end of the springs secured to the bottom of the seat 1, adjacent the center thereof, it will provide a brace for the remaining portion of the spring and retain the loops 8 in their effective positions. It will also be noted that by having the loops 9 formed in the horizontal portion of the rod, which extends across the bottom of the seat, it will securely retain the spring member in position. Furthermore, by having the U-shaped loops 6 formed at each end of each of the spring members, the body of the seat will be yieldably supported upon the upper edge of the vehicle body and, at the same time, be so arranged that it can be quickly and readily removed from the body of the vehicle, or placed thereon. It will be noted that the construction of my improved seat spring is extremely simple and is such that it can be readily formed out of a single rod of metal of any desired weight and through this construction, can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features, or departing from the scope of the invention, as defined by the appended claims.

It will be noted that by having the lower portions of the spring members wider, it will strengthen the support and prevent the seat from tipping.

Having thus described this invention, what I claim is:—

1. A device of the class described including a seat member, springs arranged beneath each end thereof, each spring consisting of a horizontal portion, having loops formed therein providing securing eyes, spaced side members having yieldable loops formed in the intermediate portions thereof, U-shaped bearing loops at the outer ends of each of the side members, a horizontal portion connecting the outer ends of the side members, and a brace member connected with the central portion of the second horizontal member and having its inner end connected with the seat, as and for the purpose set forth.

2. A device of the class described including a seat member, a spring arranged under each end thereof, each of said springs including a horizontal portion provided with loops, means extending through the loops to secure the springs to the seat, side members extending out from the horizontal portion and having loops formed therein, the lower ends of said side members having U-shaped loops, a second horizontal portion connecting the U-shaped loops, a brace member having one end connected with the second horizontal portion, and the other end connected with the seat, and a yieldable loop formed in the intermediate portion of the brace member, as and for the purpose set forth.

3. A device of the class described including a seat, spring members arranged beneath each end thereof, each of said spring members including a single rod of metal having one end secured to the seat, thence extended outwardly and bent at right angles, the wire then bent to form a U-shaped loop, thence bent upon itself to provide a side portion, thence coiled to form a yieldable loop, thence bent at right angles to form a horizontal portion, loops formed in the horizontal portion, means extended through the loops and engaging the seat member to retain the spring in position, the wire being then extended downwardly and bent upon itself to form a yieldable loop then bent to form a U-shaped bearing loop arranged in alinement with the first U-shaped loop, and thence extended horizontally and the second end of the wire being connected at a point adjacent the first end of the wire, as and for the purpose set forth.

4. A spring support formed from a single rod of metal bent to form a horizontal portion, U-shaped members formed on the terminals thereof, side members rising from the U-shaped members, a horizontal member connecting the side members, and a brace extending upwardly from the first mentioned horizontal member and extending diagonally with respect to the horizontal plane.

5. A spring support formed from a single rod of metal bent to form a horizontal portion, U-shaped members formed on the terminals thereof, side members rising from the U-shaped members, a horizontal member connecting the side members, and a brace extending upwardly from the first mentioned horizontal member and extending diagonally with respect to the horizontal plane, said side members and brace member being each provided intermediate their length with a loop.

In testimony whereof I hereunto affix my signature in the presence of two witnesses.

CHARLES A. DORSEY.

Witnesses:
 W. J. BLANTON,
 J. G. HUTCHINSON.

Copies of this patent may be obtained for five cents each, by addressing the "Commissioner of Patents, Washington, D. C."